(12) United States Patent
Funke, Jr.

(10) Patent No.: US 8,944,924 B2
(45) Date of Patent: Feb. 3, 2015

(54) HELICAL WOUND FLEXIBLE TORQUE TRANSMISSION CABLE

(71) Applicant: Chris S. Funke, Jr., West Haven, CT (US)

(72) Inventor: Chris S. Funke, Jr., West Haven, CT (US)

(*) Notice: Subject to any disclaimer, the term of this patent is extended or adjusted under 35 U.S.C. 154(b) by 0 days.

(21) Appl. No.: 13/706,491

(22) Filed: Dec. 6, 2012

(65) Prior Publication Data

US 2013/0150170 A1    Jun. 13, 2013

Related U.S. Application Data

(60) Provisional application No. 61/567,943, filed on Dec. 7, 2011.

(51) Int. Cl.
| | |
|---|---|
| *F16C 1/08* | (2006.01) |
| *F16C 1/02* | (2006.01) |
| *B63H 9/10* | (2006.01) |
| *D07B 1/12* | (2006.01) |
| *D07B 7/14* | (2006.01) |
| *D07B 1/02* | (2006.01) |

(52) U.S. Cl.
CPC .. *F16C 1/02* (2013.01); *B63H 9/10* (2013.01); *D07B 1/12* (2013.01); *D07B 7/14* (2013.01); *D07B 1/02* (2013.01); *B63H 9/1035* (2013.01); *B63H 9/1042* (2013.01); *D07B 2201/106* (2013.01); *D07B 2501/2061* (2013.01)
USPC .............................. 464/57; 464/181; 114/106

(58) Field of Classification Search
USPC ................. 464/52, 53, 57–60, 181; 74/502.5; 267/180; 114/102.1, 104–106; 174/113 C; 427/116
See application file for complete search history.

(56) References Cited

U.S. PATENT DOCUMENTS

| | | | |
|---|---|---|---|
| 2,875,597 A | | 3/1959 | Neubauer |
| 2,917,909 A | | 12/1959 | Josutis |
| 2,949,753 A | | 8/1960 | Menoni |
| 3,118,159 A | * | 1/1964 | Kollmann ................... 464/57 X |
| 3,397,420 A | * | 8/1968 | Schneider ................... 464/57 X |

(Continued)

FOREIGN PATENT DOCUMENTS

| | | | | |
|---|---|---|---|---|
| JP | 5-87117 A | * | 4/1993 | .................... 464/181 |
| JP | 5-87118 A | * | 4/1993 | .................... 464/181 |
| SU | 490964 | * | 11/1975 | ...................... 464/57 |

OTHER PUBLICATIONS

International Search Report & Written Opinion of the International Searching Authority, Application No. PCT/US2012/068122, Completed: Jan. 24, 2013; Mailing Date: Feb. 8, 2013, 9 pages.

*Primary Examiner* — Gregory Binda
(74) *Attorney, Agent, or Firm* — Anderson Gorecki & Rouille LLP

(57) ABSTRACT

A cable adapted to transmit torque in rigging or furling a sail of a boat includes a core having at least one termination end and a bight, and at least one layer of fiber wound around the core, wherein a fiber in a portion of the fiber layer disposed over a center portion of the bight has a first pitch angle relative to a longitudinal axis of the core and wherein a fiber in a portion of the fiber layer disposed over the at least one termination end has a second pitch angle relative to the longitudinal axis of the core. The fiber layer includes a transition zone disposed between the at least one termination end and the center portion, wherein a fiber in the transition zone has an orientation that transitions from the first pitch angle to the second pitch angle.

9 Claims, 4 Drawing Sheets

(56) References Cited

U.S. PATENT DOCUMENTS

| | | | |
|---|---|---|---|
| 3,522,713 A * | 8/1970 | Hayes | 464/57 X |
| 3,581,523 A | 6/1971 | Bartholomew | |
| 4,124,971 A | 11/1978 | Taylor et al. | |
| 4,185,473 A | 1/1980 | Troost | |
| 4,723,499 A | 2/1988 | Furgang | |
| 5,619,946 A | 4/1997 | Wallasch | |
| 5,683,300 A * | 11/1997 | Yasui et al. | 464/181 |
| 5,803,812 A | 9/1998 | Kakiuchi et al. | |
| 5,820,464 A | 10/1998 | Parlato | |
| 6,886,484 B2 | 5/2005 | Thomas | |
| 7,975,635 B2 | 7/2011 | Greghi | |
| 8,117,817 B2 | 2/2012 | Markham et al. | |
| 2004/0154516 A1 | 8/2004 | Thomas | |
| 2008/0066668 A1 | 3/2008 | Greghi | |
| 2012/0186851 A1 | 7/2012 | Winterhalter et al. | |

\* cited by examiner

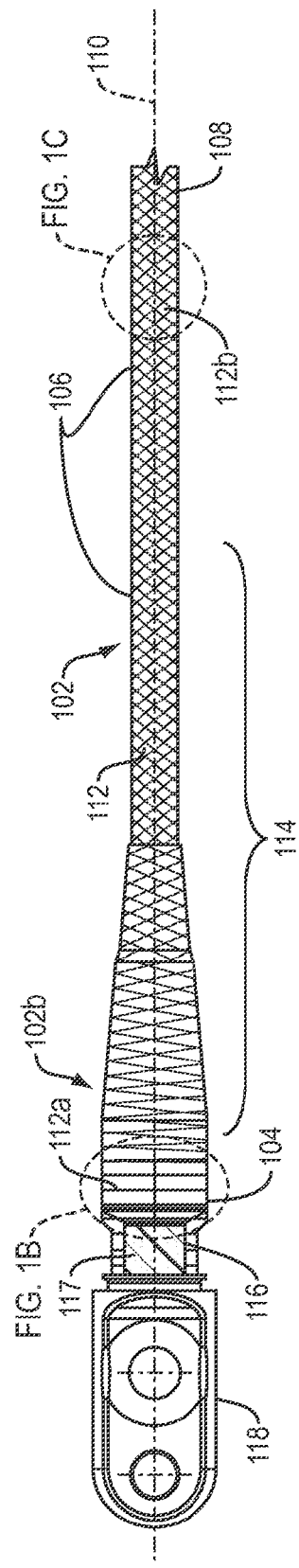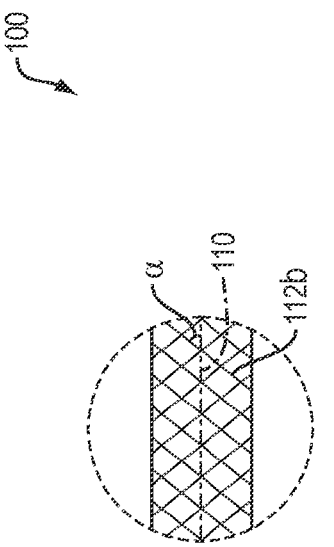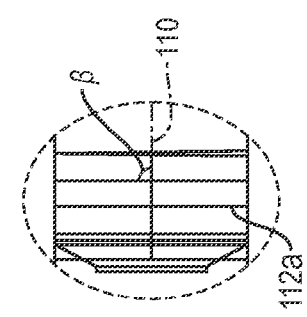

HELICAL WOUND FLEXIBLE TORQUE TRANSMISSION CABLE

FIELD OF THE INVENTION

The invention relates to a rigging and furling device for sailboats and more specifically to a luff rope or cable that is capable of providing efficient torque transmission and withstanding high tension, and has a fiber structure which resists breakdown as a result of repeated use.

BACKGROUND OF THE INVENTION

There are many rope and cable products in the market that are used in rigging and furling applications. These conventional rope products serve as inexpensive assemblies that work sufficiently in various sailing conditions. Nevertheless, as sail boats increase in size and/or their sails become larger (e.g., larger luff length), the performance of conventional ropes becomes increasingly worse. In particular, they lack rigging/furling efficiency and safety.

A luff rope, in particular, is adapted to transmit torque up from a furler to a top swivel. Some luff ropes are described in U.S. Pat. No. 4,124,971 to Taylor et al. and U.S. Pat. No. 8,117,817 to Markham et al. For the luff rope to be effective in furling systems, numerous turns must be applied to the furler drum to "pre-twist" the luff rope and thus generate and transfer torque quickly up to the top swivel. The pre-twisting may reduce the time needed to furl a sail but may also cause an instantaneous furl at or near the top swivel. This negative outcome results in a very tight and often detrimental wrapping of the sail. In addition, the act of pre-twisting may cause the sail to overwrap about the luff rope due to the instantaneous furl. By pre-twisting the luff rope, an excess of energy is stored therein, which causes the rope to become uncontrollable when the process of furling is initiated.

Conventional luff ropes often comprise a central core of high strength material (e.g., polybenzoxazole (PBO), Kevlar®, Technora®) and multiple layers of fiber braided over the central core with adhesive disposed between the fiber layers and the core. The fiber layers may further be impregnated with resin to improve the tensile strength of each individual fiber. However, conventional ropes are not able to transmit torque efficiently and safely in furling systems (e.g., top-down furling). They have a tendency to break down with repeated use, especially when they are subjected to high tension and torque. The resin binding the fibers can fail due to the overall flexibility of the luff rope as well as fiber movement caused by core compression and rope/cable coiling. In addition, conventional ropes often form kinks when they are tightly coiled or flaked for stowage.

While conventional ropes and cables may work with furling systems, they still suffer from several disadvantages. One disadvantage is that conventional ropes fail to provide efficient torque transmission properties without relying on resin-impregnated fibers. Another disadvantage is that conventional ropes often malfunction in furling systems, either wrapping the sail too tightly or overwrapping the sail. Moreover, the ropes, and specifically their resin-impregnated fibers, are prone to break down or experience damage after repeated furling and coiling. It is therefore desired to overcome these disadvantages and provide a cable that has improved torque transmission characteristics. It is also desired to provide a cable that is robust and avoids physical breakdown and deterioration of performance associated therewith. It is further desired to provide a cable that does not require the infusion of resin into fibers in order to achieve high tensile strength and efficient torque transmission.

SUMMARY OF THE INVENTION

Accordingly, it is an object of the present invention to remedy the problems of conventional ropes which fail to provide quick and efficient furling of a sail. The present invention provides a cable for efficient torque transmission in rigging or furling sails of all sizes.

It is a further object to provide a torque transmission cable having a flexible structure that can withstand fiber breakage caused by core compression, cable coiling, high tensile force applied to the cable, and/or high torque applied to the cable.

It is an additional object to provide a torque transmission cable wherein fibers of the cable become tensioned when the cable itself is tensioned axially.

It is another object to provide a torque transmission cable that is adapted to provide a high rate of torque transfer without requiring pre-twisting, or at least substantial pre-twisting, of the cable within a furler drum of a furling system.

These and other objectives are achieved by providing a cable adapted to transmit torque in rigging or furling a sail of a boat including a core having a termination end and a bight, and one layer of fiber wrapped or wound around the core, wherein at least one fiber in a portion of the fiber layer disposed over a center portion of the bight has a first pitch angle relative to a longitudinal axis of the core, wherein at least one fiber in a portion of the fiber layer disposed over the termination end has a second pitch angle relative to the longitudinal axis, and wherein the fiber layer comprises a transition zone disposed between the at least one termination end and the center portion of the bight. At least one fiber in the transition zone has an orientation that changes from the first pitch angle to the second pitch angle. The transition zone defines the part of the cable where the fiber maintains a pitch angle which gradually transitions from the first pitch angle to the second pitch angle.

Noted herein, the term "bight" defines the middle part of a cable or rope, as distinguished from the ends.

In some embodiments, the first pitch angle is less than the second pitch angle. Accordingly, the angle of the fiber increases from the center portion of the bight towards the termination end. In alternative embodiments, the first pitch angle is greater than the second pitch angle, such that the pitch angle of the fiber decreases from the center portion of the bight towards the termination end. The gradual transitioning of pitch angle of the fiber layer is adapted to aid in transmitting torque load quickly and efficiently.

Further objectives are achieved by providing a torque transmission cable having at least one termination end and a bight, at least one layer of fiber wound around the core, and a transmission zone where the orientation of at least one fiber in the fiber layer changes from a first pitch angle at a center portion of the bight to a second pitch angle at the termination end, wherein the at least one fiber layer includes at least one fiber helically wound around the core.

Where the fiber layer comprises only one fiber, the fiber may be equally wound around the core from the center portion of the bight towards the termination end in a clockwise (e.g., S-twist) or counterclockwise (e.g. Z-twist) direction. The fiber layer may comprise a plurality of fibers, wherein all fibers are wound around the core in the clockwise direction, or alternatively in the counterclockwise direction, from the center portion towards the termination end of the core. In some embodiments where the fiber layer comprises multiple fibers, a first set of the fibers is wrapped around the core in a clockwise direction while a second set of the fibers is wrapped around the core in a counterclockwise direction. By adding more fibers in a single layer of fiber, the cable is able to achieve increased torque transmission capabilities. Similarly, wrapping additional layers of fiber around the core improves the torque transmission capabilities of the cable. In addition, a cable having a fiber layer comprising fibers wrapped in both clockwise and counterclockwise directions can transmit torque load differently than a cable having a fiber layer comprising fibers wrapped in a common direction. As such, various torque transmission characteristics may be achieved by adjusting the manner in which fibers are helically wound around the core.

The core of the cable may be a fiber, composite, or metallic tensile member core, or may comprise any combination of fiber, composite, and metallic materials.

In some embodiments, the first pitch angle of the fiber in the portion of the fiber layer disposed over the center portion of the bight is between thirty degrees (30°) and sixty degrees (60°). In other embodiments, the first pitch angle is further restricted between forty degrees (40°) and fifty degrees (50°). The second pitch angle of the fiber in the portion of the fiber layer disposed over the termination end may be greater than the first pitch angle. In preferred embodiments, the second pitch angle is ninety degrees) (90°. The angular configuration of the fiber from 40°-50° along the bight to 90° at the termination end provides for advantageous transmission of torque load through the bight and termination end. With the above configuration, the fiber layer provides high tensile strength, thereby enabling the cable to withstand tension applied axially on the cable. Further, the cable remains flexible when no load is applied on the cable at the termination end.

The torque transmission cable may further comprise a groove in the core proximate to the termination end. The groove is adapted to secure the at least one fiber layer to the core such that the fiber in the portion of the fiber layer disposed over the termination end is secured at the second pitch angle. The groove also ensures that the fiber layer does not unravel from the core. In other embodiments, the cable may comprise a locking mechanism positioned proximate to the termination end, wherein the locking mechanism secures the fiber layer so that the fiber disposed over the termination end is oriented in the second pitch angle.

To aid in the positioning of the fiber layer, and more specifically the fibers wrapped around the core at and/or near the termination end, the fibers within the groove may be impregnated with resin. Further, resin may be applied to the entire length of the fiber layer. The addition of resin to the fiber layer enhances the cable's capabilities to transfer torque loads. However, it is noted that resin is not required for the cable to possess efficient torque transmission characteristics.

The torque transmission cable may include an end fitting mounted to the core at the termination end, wherein the end fitting is adapted to further secure the fiber layer to the core. The end fitting may also serve as means for connecting the cable to other maritime equipment, such as a furler drum and/or top swivel of a furling system.

Other objectives are achieved by providing a torque transmission cable including a core having at least one termination end and a bight, and two or more layers of fiber concentrically wound around the core. For example, the cable may have a first fiber layer and a second fiber layer. At least one fiber in a portion of the first fiber layer disposed over a center portion of the bight has a first pitch angle relative to a longitudinal axis of the core while at least one fiber in a portion of the first fiber layer disposed over the at least one termination end has a second pitch angle relative to the longitudinal axis of the core.

The first fiber layer comprises a first transition zone disposed between the at least one termination end and the center portion of the bight, wherein at least one fiber in the first transition zone has an orientation that transitions from the first pitch angle to the second pitch angle. In addition, at least one fiber in a portion of the second fiber layer disposed over the center portion of the bight has a third pitch angle relative to the longitudinal axis of the core while at least one fiber in a portion of the second fiber layer disposed over the at least one termination end has a forth pitch angle relative to the longitudinal axis of the core. The second fiber layer comprises a second transition zone disposed between the at least one termination end and the center portion of the bight, wherein at least on fiber in the second transition zone has an orientation that transitions from the third pitch angle to the fourth pitch angle. Additional fiber layers, for example a third and fourth fiber layers, may be included in the cable.

In some embodiments, the first and third pitch angles are less than the second and fourth pitch angles, respectively. For example, with regard to the first fiber layer, the second pitch angle may be 90° while the first pitch angle may be between 40° and 50°. Similarly, with regard to the second fiber layer, the fourth pitch angle may be 90° while the third pitch angle may be between 40° and 50°. The cable may be configured such that the second and fourth pitch angles match each other. In similar respect, the first and third pitch angles may match each other. However, in some embodiments, the first pitch angle of the first fiber layer differs from the third pitch angle of the second fiber layer and/or the second pitch angle of the first fiber layer differs from the fourth pitch angle of the second fiber layer.

The cable may be designed such that each fiber layer comprises at least one fiber helically wound around the core. In some embodiments, each fiber layer comprises multiple fibers helically wound around the core, either in the same direction or in opposite directions (i.e., clockwise and counterclockwise). Moreover, the at least one fiber of each fiber layer may be applied to the core at different lengths. Accordingly, the fiber in the first layer may be wrapped around the core with a first length while the fiber in the second layer may be wrapped around the core with a second and different length. This arrangement of wrapping fibers of separate fiber layers at variable lengths provides for torque transmission characteristics to vary along the length of the cable.

With multiple fiber layers, the cable includes multiple transitions zones. The transition zones, e.g., the first transition zone of the first fiber layer and the second transition zone of the second fiber layer, may be aligned with each other such that they begin and/or end in the same positions relative to the core. However, in some embodiments, the transition zones may not be fully aligned with each other. The transition zones of the fiber layers may be configured so that they have the same lengths and therefore span the bight equally. Still, the cable need not be designed with multiple fiber layers having transitions zones of equal length. The transition zones of the fiber layers may have different lengths. By varying the alignment of the transition zones and/or the lengths of the transition zones, various torque transmission characteristics may be achieved in the cable.

Other features and aspects of the invention will become apparent from the following detailed description, taken in conjunction with the accompanying drawings, which illustrate by way of example, the features in accordance with embodiments of the invention. The summary is not intended to limit the scope of the invention, which is defined solely by the claims attached thereto.

BRIEF DESCRIPTION OF THE DRAWINGS

FIGS. 1A-1C are schematic views of a torque transmission cable according to an exemplary embodiment of the present invention.

DETAILED DESCRIPTION OF THE INVENTION

The following detailed description illustrates the invention by way of example, not by way of limitation of the principles of the invention.

As used herein, the term "cable" encompasses cordage, lines, wires, and ropes that connect and manipulate the sails of a boat, such as rigging and furling the sails.

Figure 2:
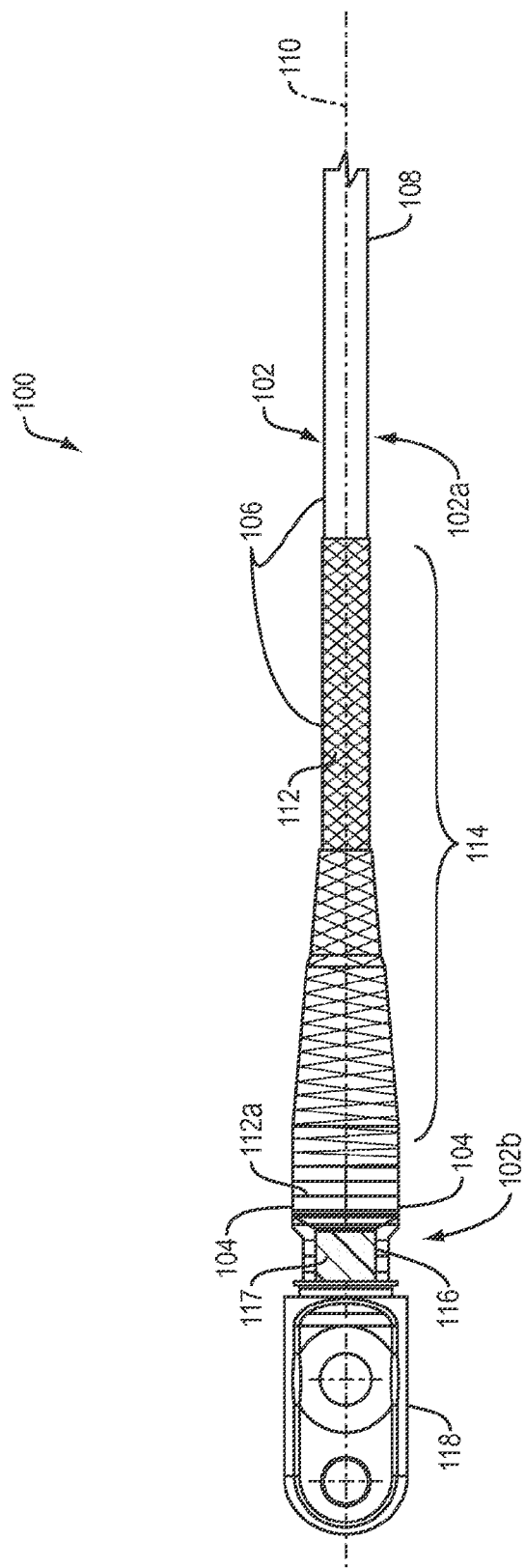
FIG. 2 is a schematic view of the torque transmission cable of FIG. 1 showing the core partially wrapped by a layer of fiber.
Figure 3:
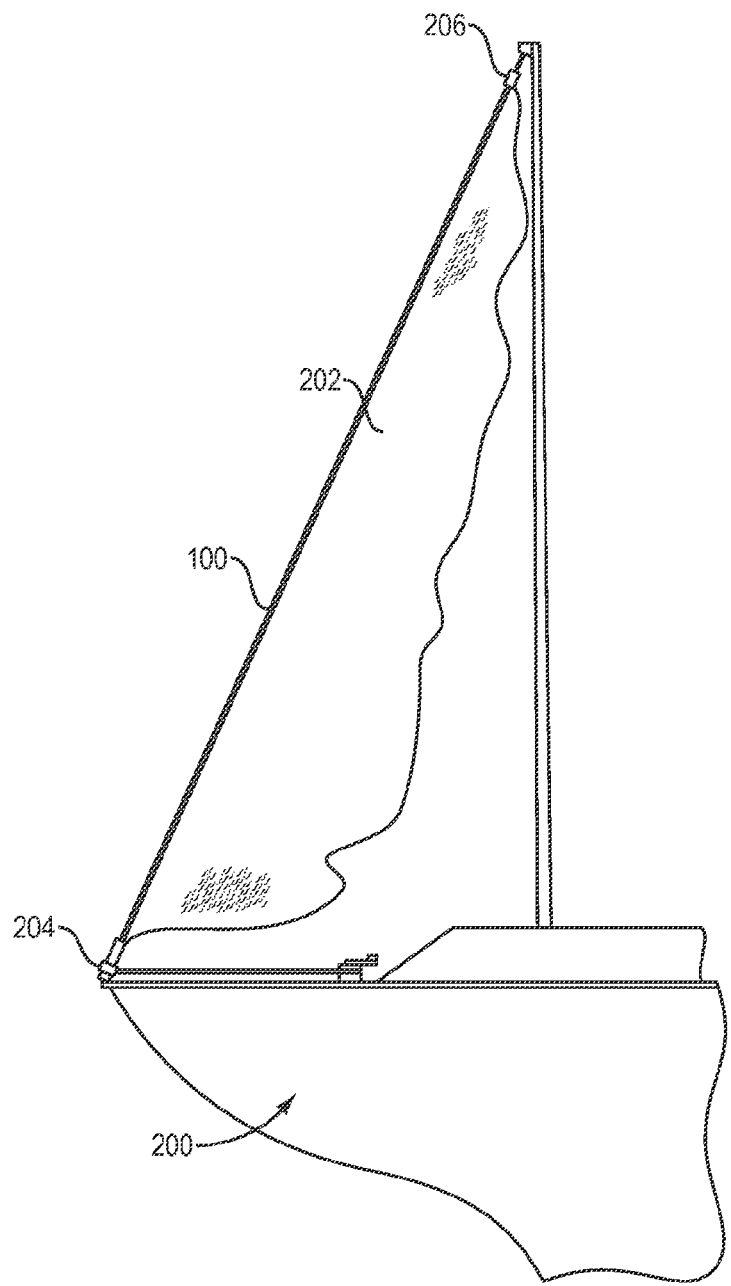
FIG. 3 is a side view of a sailboat having the torque transmission cable of FIG. 1 integrated into a furling system.

As previously noted, the term "bight" refers to the middle part of a cable, as distinguished from the ends Referring to the figures in detail and first to FIGS. 1-3, there is shown an exemplary embodiment of a cable 100 for rigging or furling a sail 202 of a boat 200. The cable 100 is designed with a central core 102 having at least one termination end 104 and a bight 106. Often, the core 102 includes two termination ends 104 positioned on opposing sides of the bight 106. The core 102 may be made from natural or synthetic fiber, composites, metallic alloys, or any combination of these materials. For example, the core may be made of polybenzoxazole (PBO). Aramids, such as Kevlar® and Technora®, may also be used to make the core 102. The core 102 is axially stiff, has high tensile strength, and is adapted to withstand the tension and torque load applied on the cable 100 when rigging or furling the sail 202 (see FIG. 3). However, when there is no load on the cable 100, the core 102 remains flexible.

In preferred embodiments, the core 102 is designed with a first diameter 102a along the bight 106 and a second diameter 102b at the termination end 104. The second diameter is set to be greater than the first diameter. This configuration of the core 102 helps improve the cable's tensile strength and ability to efficiently transfer torque loads applied at the termination end. The core 102 is also constructed such that the termination end having the second diameter tapers towards the bight having the first diameter. This feature ensures a smooth transfer of tension and torque load between the termination end 104 and the bight 106.

The cable 100 includes at least one layer of fiber 112 (112a, 112b) firmly wound over and around the core 102. The fiber layer 112—and the individual fibers therein—has high stiffness and is applied at high tension to reduce its play once it is wound around the core 102. The fiber layer 112 also has high tensile and torsional strength. Accordingly, the performance of the fiber layer does not degrade after being repeatedly subjected to tensile forces and/or torque load applied on the cable during furling and unfurling of the sail 202. In some embodiments, the fiber layer 112 comprises a single fiber helically wound around the core 102, either in a clockwise direction (e.g., S-twist) or counterclockwise direction (e.g., Z-twist) from the bight 106 towards the termination end 104. In other embodiments, the fiber layer 112 comprises a plurality of fibers wrapped around the core 102 in a helical configuration. The multiple fibers may all be wrapped around the core 102 in a clockwise or counterclockwise direction from the bight towards the termination end. Alternatively, the fiber layer 112 may be constructed with a first set of fibers wrapped around the core 102 in a clockwise direction while a second set of fibers is wrapped around the core 102 in a counterclockwise direction.

The fiber(s) in the fiber layer may be a textile fiber, natural fiber (e.g., hemp, linen, cotton), or synthetic fiber (e.g., polypropylene, nylon, polyesters, polyethylene, aramids, acrylics). In the case where the fiber layer 112 includes multiple fibers, each of the fibers may be composed of the same material. In other embodiments, the fiber layer may include a collection of different types of fibers, in order to achieve various tensile strength and torque transmission characteristics. The fiber layer, for example, may have synthetic fibers and natural fibers adjacently wound around the core or an arrangement of polyester fibers and aramids wrapped around the core.

A feature of the cable 100 which provides for efficient torque transmission characteristics is the angular configuration of the fiber in the fiber layer 112 wound around the core 102. In particular, at least one fiber in the fiber layer 112, or more specifically in section 112b, disposed over a center portion 108 of the bight 106 has a first pitch angle $\alpha$ relative to the longitudinal axis 110 of the core. Conversely, at least one fiber in the fiber layer 112, or more specifically in section 112a, disposed over the termination end 104 is wound around the core 102 such that the fibers have a second pitch angle $\beta$ relative to the longitudinal axis 110 of the core. Further, between the termination end 104 and the center portion 108 of the bight, a transition zone 114 is introduced in the fiber layer 112. The fiber(s) disposed within the transition zone 114 is configured such that it has an orientation which gradually changes from the first pitch angle $\alpha$ (defining the fiber located over the center portion of the bight) to the second pitch angle $\beta$ (defining the fiber located over the termination end). It is noted that, in some cases, the transition zone may provide for the pitch angle of the fiber(s) to shift by incremental jumps in degree, instead of a smooth and continuous transition.

The transition zone 114 extends over a section of the bight 106 of the core 102 in some embodiments. For example, the transition zone 114 may span partially or entirely the portion of the core where the termination end 104 tapers towards the bight 106. The transition zone 114 may instead span a length greater than the portion of the core where the termination end tapers towards the bight (see FIG. 1). In other embodiments, the position of the transition zone 114 may be confined to the termination end only. Still, in further embodiments of the cable 100, the transition zone 114 may extend both the termination end 104 and a portion of the bight 106 adjacent to the termination end. Any of these configurations of the transition zone provides for efficient torque transmission characteristics in the cable.

In preferred embodiments, the first pitch angle $\alpha$ is less than the second pitch angle $\beta$. The angular orientation of the fiber wrapping, therefore, increases from the center portion 108 towards the termination end 104. The first pitch angle $\alpha$ of the fiber in the fiber layer 112 disposed over the center portion 108 of the bight 106 is generally between 30° and 60°, inclusive. In further embodiments, the first pitch angle $\alpha$ is set between 40° and 50°, inclusive. The second pitch angle $\beta$ of the fiber in the fiber layer 112 disposed over the termination end 104 is preferably 90°. When the second pitch angle $\beta$ is 90°, the section of the fiber layer 112 disposed over the termination end (112a), and more specifically the at least one fiber therein, no longer wraps around the core 102 in helical manner. Instead, the at least one fiber wraps around the core 102 in a concentric—or substantially concentric—manner. It is noted that once the fiber layer 112 transitions to 90° at and/or proximate to the termination end 104, additional concentric wrapping of the at least one fiber at 90° is provided. In particular, as shown in FIG. 1, the fiber disposed within a groove 116 (discussed below in further detail) is wrapped around the core 102 with a 90° pitch angle.

With the above angular orientation and transitioning of the fiber layer 112, and in particular the incorporation of 90° fibers at the termination end 104, the transmission of torque load through the cable 100 can be maximized. Moreover, the angular orientation and transitioning of the fiber layer provides for the cable to efficiently transfer torque load without requiring the infusion of resin into the fibers. In contrast to the above configuration of pitch angles, the fiber layer 112 may be designed with the first pitch angle α being greater than the second pitch angle β. Accordingly, the pitch angle of the fiber wrapping decreases from the center portion 108 of the bight 106 towards the termination end 104.

Regardless of whether the first pitch angle is greater than or less than the second pitch angle, the core 102 with the at least one fiber layer 112 provides for high axial stiffness when a load is applied to the cable. This characteristic is important since the application of high tensile load on the cable—and in general any luff rope/cable—is necessary to achieve proper sail shape for stowing or dousing the sail. As the cable 100 is tensioned axially, the fibers within the fiber layer 112 are also tensioned, thereby improving the cable's performance and response in rigging or furling operations. The cable 100 can withstand high tensile forces experienced during furling or unfurling the sail 202 (see FIG. 3). In addition, when there is no load on the cable 100, it remains flexible. This feature of the cable provides for the cable to be easily flaked or coiled in a relatively small diameter for stowage, without causing damage to the core 102 or the fiber layer 112 and without impairing the overall integrity of the cable.

The core 102 may include a groove or slot 116 at the termination end 104 for securing the fiber in terminal section of the fiber layer (112a) to the core 102 at the second pitch angle β. For example, the fiber layer 112a wrapped around and within the groove 116 is positively locked at 90°. The groove 116 is further adapted to reduce the play of the fiber layer disposed at the termination end 104 as well as the fiber layer disposed along the bight 106. In some embodiments, the cable 100 uses a locking mechanism instead of a groove to positively lock the fiber layer incorporated into the termination end 104 at the second pitch angle β. In other embodiments, the cable 100 includes both a groove 116 and a locking mechanism to secure the fiber layer to the core and reduce any play or movement of the fiber layer relative to the core.

The cable 100, with the features of the core 102, fiber layer 112, transition zone 114, and groove 116, is adapted for efficient torque transmission, wherein, for example, one turn in the furler drum 204 results in one turn at the top swivel 206, thus ensuring good furling of the sail 202 (see FIG. 3). The cable 100 is able to accommodate high torque transfer loads in order to initiate furling as quickly as possible. In other words, the cable is adapted such that the furler drum 204 requires less number of turns before a corresponding top swivel 206 begins to turn and wrap the top portion of the sail 202.

Figure 4D:
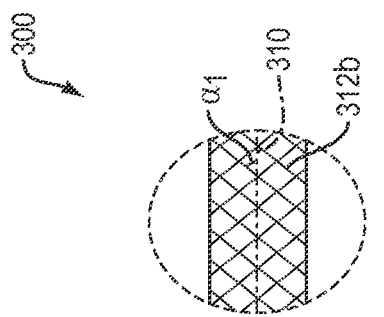
FIGS. 4A-4D are schematic views of a torque transmission cable according to another exemplary embodiment of the present invention.
Figure 4C:
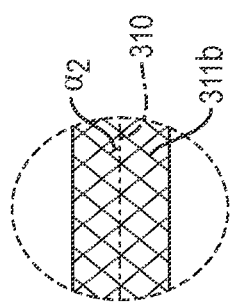
Figure 4B:
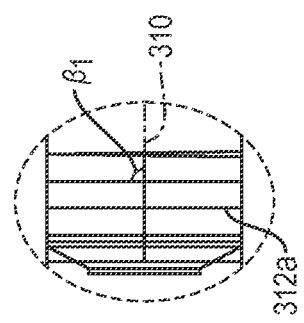
Figure 4A:
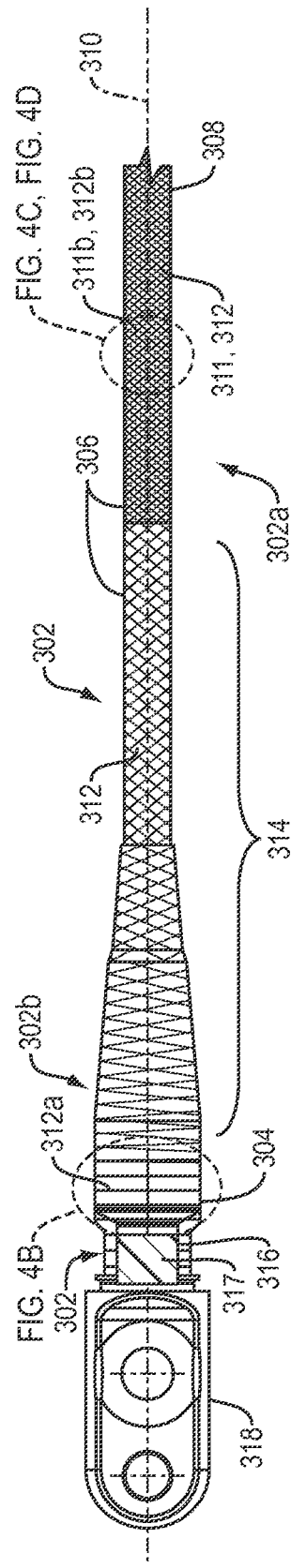

It is noted that the cable 100 is able to provide efficient torque transmission without relying on resin and impregnating the fiber layer 112 with resin. However, resin 117 (also shown as 317 in FIG. 4A) may be incorporated into the cable 100 in order to further enhance the cable's tensile strength and torque transmission capabilities as well as reinforce the positioning of the fiber layer. In some embodiments, resin 117 is added in the groove 116, such that the fibers disposed therein are fused with resin. In other embodiments, resin is applied in the groove 116 and along the termination end 104 of the core 102. Still further, the fiber layer 112, along the entire length of the cable (i.e., from center portion 108 of bight 106 to the termination end 104 including groove 116) may be impregnated with resin.

As shown in FIGS. 1-2, the cable 100 also includes an end fitting 118 mounted to the at least one termination end 104 of the core 102. More specifically, the end fitting 118 is attached to the groove 116 and is adapted to secure the fiber layer 112 to the core 102 and prevent the fibers from fraying. The end fitting 118 also serves as a connection between the cable 100 and other maritime equipment, such as a furler drum 204 or a top swivel 206 of a furling system. Different types of end fittings, including marine eye, lashing eye, spreader eye, fork, toggle, bi-conic socket, turnbuckle, threaded stud, headed stud, strop, halyard lock, etc., may be used in the cable 100.

Referring to FIG. 4, another exemplary embodiment of the torque transmission cable is disclosed herein. More specifically, a cable 300 includes a core 302 having two termination ends 304 and a bight 306 between the ends 304. The core 302 comprises a first diameter 302a along the bight 306 and a second diameter 302b at the termination ends 304, wherein the second diameter is greater than the first diameter. A portion of the core 302 tapers between the termination ends and the bight. Further, the cable 300 includes two or more layers of fiber (designated as elements 311, 312) wrapped concentrically over and around the core 302. By including multiple fiber layers 311, 312, wherein each fiber layer includes a transition zone 314, the torque transmission characteristics of the cable 300 are further enhanced as compared to a cable having only one fiber layer. Noted herein, for ease of illustration, FIG. 4 shows only a portion of a second fiber layer 311 wrapped over the core 302.

Each of the fiber layers 311, 312 comprises one or more fibers. Each fiber in first fiber layer 312 and second fiber layer 311 is helically wound around the core 302. In some embodiments, all the fibers in a given fiber layer are wound in a clockwise (e.g., S-twist) or counterclockwise direction (e.g., Z-twist) from one termination end to the other. Alternatively, a first subset of fibers in a given fiber layer are wound in a clockwise direction while a second subset of fibers are wound in a counterclockwise direction. The fiber wrapping of separate fiber layers 311, 312 may also be designed to either match or vary. For example, the fibers in first fiber layer 312 and second fiber layer 311 are both wound helically in a clockwise (or counterclockwise) direction. In contrast, the fibers in first fiber layer 312 may be wound in a clockwise direction while the fibers in second fiber layer 311 may be wound in a counterclockwise direction.

As shown in FIG. 4, each fiber layer comprises a portion disposed over a center portion 308 of the bight 306. In particular, the first fiber layer 312 includes a portion 312b having at least one fiber that is disposed over the center portion of the bight and that has a first pitch angle $\alpha_1$ relative to the longitudinal axis 310 of the core 302. The second fiber layer 311 includes a portion 311b having at least one fiber that is disposed over the center portion of the bight and that has a third angle $\alpha_2$ relative to the longitudinal axis 310. Each fiber layer also comprises a portion having at least one fiber that is disposed over the termination end 304 and that has a different pitch angle configuration. Specifically, the first fiber layer 312 has a portion 312a having at least one fiber that is disposed over the termination end and that is defined by a second pitch angle $\beta_1$. The second fiber layer 311 has a portion 311a having at least one fiber that is disposed over the termination end and that is defined by a fourth pitch angle $\beta_2$. It is noted that portion 311a of second fiber layer 311 and fourth pitch angle $\beta_2$ are not identified in FIG. 4 due to ease of illustrating multiple fiber layers wrapped around the core.

Between the termination ends 304 and the center portion 308 of the bight 306, each fiber layer 311, 312 has a transition zone 314. Accordingly, the fibers disposed within the transition zone of the first fiber layer 312 are arranged such that they have an orientation which gradually transitions from the first pitch angle $\alpha_1$ to the second pitch angle $\beta_1$. On the other hand, the fibers disposed within the transition zone of the second fiber layer 311 are arranged such that they have an orientation which gradually transitions from the third pitch angle $\alpha_2$ to the fourth pitch angle $\beta_2$.

In some embodiments, the first and third pitch angles $\alpha_1$, $\alpha_2$ are less than the second and fourth pitch angles $\beta_1$, $\beta_2$, respectively. As such, the angular orientation of the fiber wrappings in first fiber layer 312 and second fiber layer 311 increases from the center portion 308 towards the termination end 304. The first pitch angle $\alpha_1$ and the third pitch angle $\alpha_2$ may be set to either coincide/match or differ in degrees. Similarly, the second pitch angle $\beta_1$ and fourth pitch angle $\beta_2$ may be the same or different. However, it is preferable that the second and fourth pitch angles be set to the same degree, i.e. 90°. Regarding the first and third pitch angles, each angle is preferably between 40° and 50°.

The position of the transition zones 314 of the fiber layers 311, 312 relative to one another may vary. In some embodiments, the transition zones 314 are aligned with each other such that they begin and/or end in the same location on the core. In other embodiments, the transition zones 314 may not be aligned, i.e., the beginning and end of each of the transition zones 314 do not coincide. By adjusting the location of the transition zones of each fiber layer on the core so that they are aligned (i.e., the start and/or end of the transition zones are parallel) or not aligned, the cable 300 can possess different torque transmission and tensile strength characteristics.

The transitions zones 314 of the fiber layers 311, 312 may also vary in their lengths. In other words, each transition zone may span the core 302 differently. For example, the transition zone of one fiber layer may extend the entire length of the bight 306 of the core 302 while the transition zone of another fiber layer may extend only partially the length of the bight 306. As another example, the transition zone of one fiber layer may extend over a section of the bight 306 while the transition zone of another fiber layer extends both the termination end 304 and a section of the bight 306. Conversely, the transition zones of the all the fiber layers may span the core 302 equally. For example, the transition zone of each fiber layer may be set to span the core by one foot (1 ft). As such, the transitioning of pitch angle of each fiber layer occurs within a common length of the core. By adjusting the lengths of the transition zones of each fiber layer so that they are the same or differ, the cable 300 can possess different torque transmission and tensile strength characteristics.

The cable 300 can also be designed with variable fiber dimensions between different fiber layers 311,312. For example, the fibers in the first fiber layer 312 may be wound around the core 302 with one fiber length while the fibers in the second fiber layer 311 may be wrapped around the core 302 with a different fiber length. By varying the fiber lengths between the fiber layers, the cable 300 can achieve torque transmission characteristics which vary along the cable.

The cable 300 with multiple fiber layers 311, 312 may include a groove 316 in the core 302 at the termination end 304, or a locking mechanism disposed at the termination end 304, for securing the terminal sections 312a, 311a of each fiber layer to the core 302 at corresponding second and fourth pitch angles. The groove 316 (and locking mechanism) also helps to prevent play in each of the fiber layers 311, 312.

The cable 300 also includes an end fitting 318 mounted to the termination end 304 adjacent to the groove 316. The end fitting 318 is adapted to secure the multiple fiber layers 311, 312 to the core 302 as well as connect the cable 300 with other maritime equipment (e.g., furler drum 204, top swivel 206).

In view of the above, the cable 100 and cable 300 are specifically adapted to provide high tensile and torsional strength. These features are important since luff cables are subjected to high loads during rigging and furling operations. Compared to conventional ropes and cables, such as braided or resin impregnated braided cables, the cable 100 and cable 300 both provide superior torque transfer capabilities by gradually changing the angular orientation of fiber layer(s) from 40°-50° to 90° and without relying on resin.

Although the invention has been described with reference to particular arrangement of parts, features, and the like, these are not intended to exhaust all possible arrangements or features, and indeed many modifications and variations will be ascertainable to those of skill in the art.

What is claimed is:

1. A cable adapted to transmit torque in rigging or furling a sail, said cable comprising:
   a core having at least one termination end and a bight; and
   at least one layer of fiber wound around said core;
   wherein a fiber in a portion of said fiber layer disposed over a center portion of said bight has a first pitch angle relative to a longitudinal axis of said core;
   wherein a fiber in a portion of said fiber layer disposed over said at least one termination end has a second pitch angle relative to said longitudinal axis of said core;
   wherein said fiber layer comprises a transition zone disposed between said at least one termination end and said center portion of said bight, wherein fiber in said transition zone has an orientation that transitions from said first pitch angle to said second pitch angle;
   wherein said core comprises a groove at said termination end, said groove securing said fiber layer to said core such that said fiber in said portion of said fiber layer disposed over said termination end is secured at the second pitch angle;
   wherein said core has a first diameter along said bight and a second diameter at said termination end proximate to said groove, said second diameter being greater than said first diameter; and
   wherein at least said fiber layer disposed within said groove is impregnated with resin.

2. The cable of claim 1, wherein said at least one layer of fiber comprises at least one fiber helically wound around said core.

3. The cable of claim 1, wherein said core comprises a material selected from a group consisting of fiber, composite, and metal.

4. The cable of claim 1, wherein said first pitch angle is between 30.degree. and 60.degree., inclusive.

5. The cable of claim 4, wherein said first pitch angle is between 40.degree. and 50.degree., inclusive.

6. The cable of claim 1, wherein said second pitch angle is 90.degree.

7. The cable of claim 1, wherein said transition zone is aligned with a portion of said core where said termination end tapers towards said bight.

8. The cable of claim 1, further comprising an end fitting attached at said termination end of said core.

9. The cable of claim 1, wherein with said termination end being free of tensile and torque load, said core and fiber layer are flexible, and with said termination end being loaded, said core and fiber layer are axially stiff.

* * * * *